United States Patent
Miyagi et al.

(10) Patent No.: US 11,549,964 B2
(45) Date of Patent: *Jan. 10, 2023

(54) PHASE-SHIFT-BASED AMPLITUDE DETECTOR FOR A HIGH-SPEED ATOMIC FORCE MICROSCOPE

(71) Applicant: Cornell University, Ithaca, NY (US)

(72) Inventors: Atsushi Miyagi, Astria, NY (US); Simon Scheuring, New York, NY (US)

(73) Assignee: Cornell University, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,132

(22) Filed: Feb. 7, 2022

(65) Prior Publication Data

US 2022/0260612 A1   Aug. 18, 2022

Related U.S. Application Data (63) Continuation of application No. 17/263,485, filed as application No. PCT/US2019/043049 on Jul. 23, 2019, now Pat. No. 11,243,229.

(60) Provisional application No. 62/703,679, filed on Jul. 26, 2018.

(51) Int. Cl.
*G01Q 60/34* (2010.01)
*G01Q 10/06* (2010.01)

(52) U.S. Cl.
CPC ........... *G01Q 60/34* (2013.01); *G01Q 10/065* (2013.01)

(58) Field of Classification Search
CPC .............................. G01Q 60/34; G01Q 10/065

USPC ...................... 850/21, 33, 36, 37, 38, 39, 40
See application file for complete search history.

(56) References Cited

U.S. PATENT DOCUMENTS 11,243,229 B2 *  2/2022  Miyagi ................. G01Q 60/34
2017/0038410 A1   2/2017  Serry

FOREIGN PATENT DOCUMENTS

EP           2325657 A1    5/2011

OTHER PUBLICATIONS

International Search Report and Written Opinion dated Oct. 7, 2019 in International Application No. PCT/US2019/043049.
Anczykowski, B., et al. "How to measure energy dissipation in dynamic mode atomic force microscopy" Applied Surface Science, vol. 140, No. 3-4, pp. 376-382, Feb. 1, 1999.
Office Action dated Jul. 22, 2021 in U.S. Appl. No. 17/263,485.
Notice of Allowance dated Sep. 27, 2021 in U.S. Appl. No. 17/263,485.

* cited by examiner

*Primary Examiner* — Nicole M Ippolito
(74) *Attorney, Agent, or Firm* — McDermott Will & Emery LLP (57) ABSTRACT

An atomic force microscope includes a cantilever operating in amplitude modulation mode. A controller determines the amplitude of the cantilever oscillation by processing a signal representative of the cantilever motion by square-rooting a signal having a value substantially equal to a sum of a square of the received signal and a squared and phase-shifted version of the received signal. The aforementioned processing, in some implementations is implemented using analog circuit components.

7 Claims, 6 Drawing Sheets

PHASE-SHIFT-BASED AMPLITUDE DETECTOR FOR A HIGH-SPEED ATOMIC FORCE MICROSCOPE

RELATED APPLICATIONS

The present application is a continuation of, and claims priority to, U.S. patent application Ser. No. 17/263,485, filed Jan. 26, 2021, which is a United States National Phase under 35 U.S.C. § 371 of International Application No. PCT/US2019/043049, filed on Jul. 23, 2019, which claims priority to and the benefit of U.S. Provisional Patent Application No. 62/703,679, titled "PHASE-SHIFT-BASED AMPLITUDE DETECTOR FOR A HIGH-SPEED ATOMIC FORCE MICROSCOPE" and filed on Jul. 26, 2019, the entire contents of both of which are hereby incorporated by reference for all purposes.

TECHNICAL FIELD

The disclosure relates to atomic force microscopy; and more particularly, an amplitude detector for a high speed atomic force microscope (AFM).

BACKGROUND

Atomic force microscopy was first designed with an AFM tip (or simply called 'tip') that measured the AFM-tip deflection while the tip was scanned over solid surfaces. The nanometer scaled tip of the AFM resolved atoms on samples such as solid graphite in air. A considerable advance for the application of AFM in biology was the development of the optical lever detection system that allowed operation of the AFM tip in a fluid cell. This permitted the first breakthrough image acquisitions of proteins under close-to-native conditions. The early images were acquired in a so-called 'contact mode' where the tip was in permanent contact with the sample during scanning. In this operational mode the feedback loop was driven by the permanent measurement of the cantilever deflection $\Delta z$ which is proportional to the average applied force F following Hooke's law:

$$F = k \times \Delta z \quad \text{Eq. (1)}$$

The major advantage of contact mode imaging was that the permanent contact between tip and sample results in a tremendous signal-to-noise ratio giving access to highly contrasted images of individual proteins. The downside of 'contact mode' imaging is that it is restricted to fairly sturdy and laterally stable samples as the scanning motion with permanent tip-sample interaction implicates lateral shear forces that disrupt soft biological samples. To overcome this limitation, amplitude modulation mode (also referred to as 'tapping mode' or 'oscillating mode') was developed. In this operational mode, the cantilever oscillates at its first resonance frequency while scanning over a sample. As a consequence, the tip-sample interaction is reduced to the only parts of the cantilever oscillation cycle when the tip swings around the bottom peak of the oscillation (about 10% of the entire cycle). In amplitude modulation mode the feed-back loop is driven by the measurement of the amplitude of oscillation, the average applied force is reduced to:

$$F = k_c A_{free}/(2Q(1-(A_{set}/A_{free})^2)^{1/2}) \quad \text{Eq. (2)}$$

where F is the average applied force, $k_c$ is the cantilever spring constant, Q is the cantilever quality factor, and $A_{set}$ and $A_{free}$ are the setpoint and the free oscillation amplitude, respectively. As demonstrated above, amplitude modulation mode AFM operates generally at significantly lower force and reduced tip-sample interaction compared to contact mode AFM. The effect is further improved in high-speed AFM (HS-AFM) due to the high resonance frequency (short contact time) of the short high-speed AFM cantilevers. In high-speed AFM, due to the low applied force (e.g., 20 pN; for $k_c$=0.15 nN/nm, Q=1.5, $A_{free}$=1.0 nm and $A_{set}$=0.9 nm) the shortness of tip-sample contact (e.g., contact duration: 166 ns, scan distance per contact: 0.01 nm; for a typical cantilever resonance frequency of 600 kHz and a scan velocity of 60 µm/s) lateral shear forces are quasi-eliminated. Based on these considerations, fast and precise oscillation amplitude detection/determination is of high importance for operating an AFM and even more so for a high-speed AFM.

To make high-speed AFM faster and more sensitive, drive feedback can be employed based on every cantilever oscillation cycle or faster. The current most precise amplitude detection method is Fourier-analysis-based. This method fits every oscillation cycle wave and scores the power—i.e. amplitude—of its first Fourier component. This method is currently used in state-of-the art high-speed AFMs.

SUMMARY

Herein are disclosed methods to determine the cantilever oscillation amplitude for amplitude modulation mode AFM. A circuit or processor implementing such methods can analyze the actual cantilever oscillation amplitude continuously and with up to a 4.9 times improved (shorter) phase delay as compared to currently used Fourier-based amplitude detectors.

According to one aspect, an atomic force microscope has a cantilever operating in amplitude modulation mode, a controller including at least one processor configured to receive an input signal indicative of motion of the cantilever, calculate a resultant amplitude signal by square-rooting a signal having a value equal to a sum of a square of the input signal and a squared and phase-shifted version of the input signal, and output the resultant amplitude signal based on the square-root of the sum.

In some implementations, the controller includes a circuit. The circuit has an input branch receiving the input signal, a first branch having a first multiplier for squaring the input signal, a second branch having at least one −90 degree phase shifter for phase shifting the input signal and a second multiplier for squaring the phase shifted input signal. The circuit also includes a merge node coupling the first and second branches. The merge node includes an adder for summing the square of the input signal with the square of the phase shifted input signal. A third branch of the circuit connects to the merge node. The third branch includes square rooting logic configured to apply a square-root function to the output of the adder. The circuit also includes an output branch connected to the third branch configured to output the resultant amplitude signal.

In some implementations, the input branch couples to both the first branch and the second branch. In some implementations, the at least one −90 degree phase shifter and the second multiplier are connected in series. In some implementations, the second multiplier comprises two inputs and receives the phase shifted input signal at both of the two inputs. In some implementations, the first multiplier, the second multiplier, the −90 degree phase shifter, the adder, and the square-rooting logic comprise analog circuit components. For example, at least one of the first multiplier, the second multiplier, the −90 degree phase shifter, the adder, and the square-rooting logic can include an analog integrated circuit. In some implementations, the first multiplier, the second multiplier, the −90 degree phase shifter, the adder, and the square-rooting logic are implemented using digital logic. The digital logic can include a digital signal processor, an ASIC, and FPGA, and/or a programmed microprocessor.

In some implementations, the controller includes a circuit having an input branch, a first, a first branch and a second branch, each coupled to the input branch and merged together at a multiplier node, and a third branch that splits into a fourth branch and a fifth branch. The input branch receives the input signal. The fifth branch has a −180 degree phase shifter, and the fourth branch and the fifth branch merge at an adder. Square-rooting logic is coupled to the output of the adder, and an output branch coupled to the square-rooting logic outputs the resultant amplitude signal. In some implementations, the input branch couples to both the first branch and the second branch. In some implementations, the fourth branch couples the third branch and the adder. In some implementations, the adder adds a signal from the third branch and a signal from the fourth branch.

Another aspect of the disclosure pertains to a method of amplitude detection for an atomic force microscope. In the method, a first signal indicative of motion of a tip of a cantilever is received in response to scanning of the tip over the surface of a sample while the cantilever is being driven at a resonant frequency of the cantilever in amplitude modulation mode. The method includes calculating a resultant amplitude signal by square-rooting a signal having a value equal to a sum of a square of the first signal and a squared and phase-shifted version of the first signal, and outputting the resultant amplitude signal.

In some implementations, the first signal is a sinusoidal signal. In some implementations, the phase-shifted version of the first signal is phase shifted by −90 degrees. In some implementations, the phase-shifted version of the first signal is phase shifted by 180 degrees. In some implementations, calculation of the resultant amplitude signal is carried out by analog circuitry. The analog circuitry, in some implementations can include at least one analog integrated circuit. In some implementations, the calculation of the resultant amplitude signal is carried out by digital logic, comprising at least one of a DSP, an ASIC, and FPGA, and a programmed microprocessor.

BRIEF DESCRIPTION OF THE DRAWINGS

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
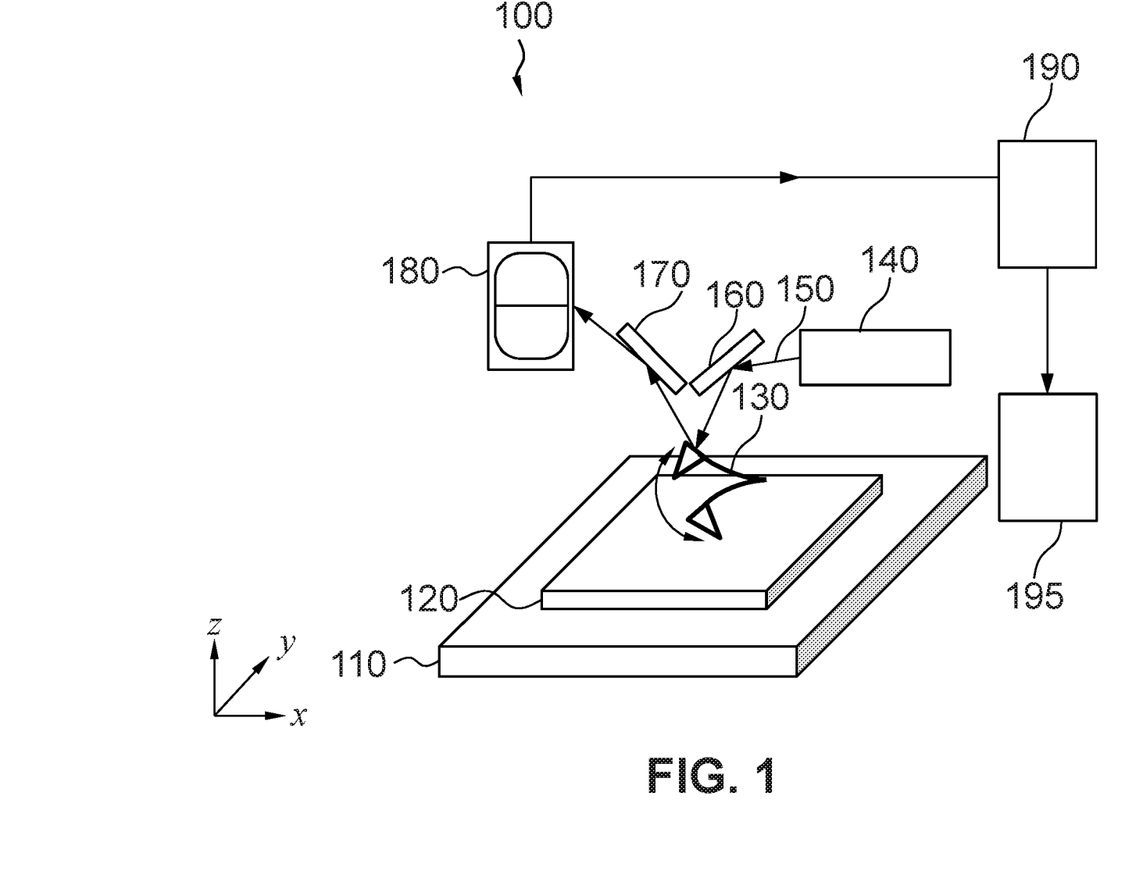
FIG. 1 illustrates a system have an atomic force microscope and a sample stage that can move in x, y, and z directions independently, according to some implementations of the present disclosure.

FIG. 1 illustrates a system 100 have an atomic force microscope (AFM) and a sample stage that can move in x, y, and z directions independently, according to some implementations of the present disclosure. The system 100 includes a sample stage 110 on which a sample such as a substrate or a semiconductor device rests. In some implementations, the sample stage 110 can move in x, y, and z directions. In some implementations, movement of the sample stage 110 can be accomplished using piezoelectric devices in x, y, and z directions. In some implementations, the sample stage 110 is controlled to have a tilted angle relative to the horizontal level.

The sample 120 resting on the sample stage 110 includes a sample to be imaged placed on a substrate such as a semiconductor substrate, including silicon, silicon oxide, or sapphire; a metal substrate including metal or a metal alloy; an organic material such as biomaterial including a lipid bilayer or ligand receptor; or a two-dimensional material such as graphite, or any material with a topography roughness range that allows the material to be imaged by the AFM cantilever.

The AFM includes a cantilever 130 which operates in tapping mode or amplitude modulation mode. The cantilever 130 vibrates at a resonant frequency. The AFM cantilever 130 can be any cantilever known in the art for use in an AFM, such as sharp tip cantilever, nanotube cantilever, blunt cantilever, magnetic cantilever, or any other cantilever that can be operated under tapping mode or amplitude modulation mode. The system 100 shown in FIG. 1 further includes a laser system 140 which emits a laser light 150 toward a first mirror 160 which reflects the laser light 150 emitted from the laser system 140 toward the top of a tip potion of the cantilever 130. The top of the tip portion of the cantilever 130 reflects the laser toward a second mirror 170 which reflects the laser toward the optical sensor 180. In other implementations, a single mirror is used and reflected light travels back to an optical sensor along substantially the same optical path the light traveled towards the cantilever, but in an opposite direction. The optical sensor 180 can include a two-quadrant diode sensor, a four-quadrant diode sensor, or an eight-quadrant diode sensor, or a photomultiplier tube, in various implementations of the present disclosure. In other implementations, the optical sensor 180 is any light sensing element. The optical sensor 180 detects the laser 150 reflected from the second mirror 170 and outputs a signal to a controller 190, which includes at least one processor. The controller 190 communicates with a user interface 195 which can control the parameters of the AFM, analyze the data collected by the AFM, provide feedback to a driver applying a drive signal to the sample stage (Z-piezo) 110, and generate an AFM output. In some setups, the drive signal is sent to a stage (Z-piezo) that holds the cantilever 130. In some implementations, other sensors besides optical sensors can be used to monitor cantilever tip 130 displacement, using, e.g., and without limitation, piezoelectric sensing, capacitive detection, or piezoresistive detection. For the sake of clarity, the remainder of this disclosure assumes optical cantilever monitoring, but similar principles can apply to AFMs using any of these (or other) cantilever monitoring techniques.

In some implementations, the user interface 195 can include a display, printer, keyboard, mouse, track-ball device, touch pad, fingerprint sensor, and/or any other input and/or output devices.

Figure 2:
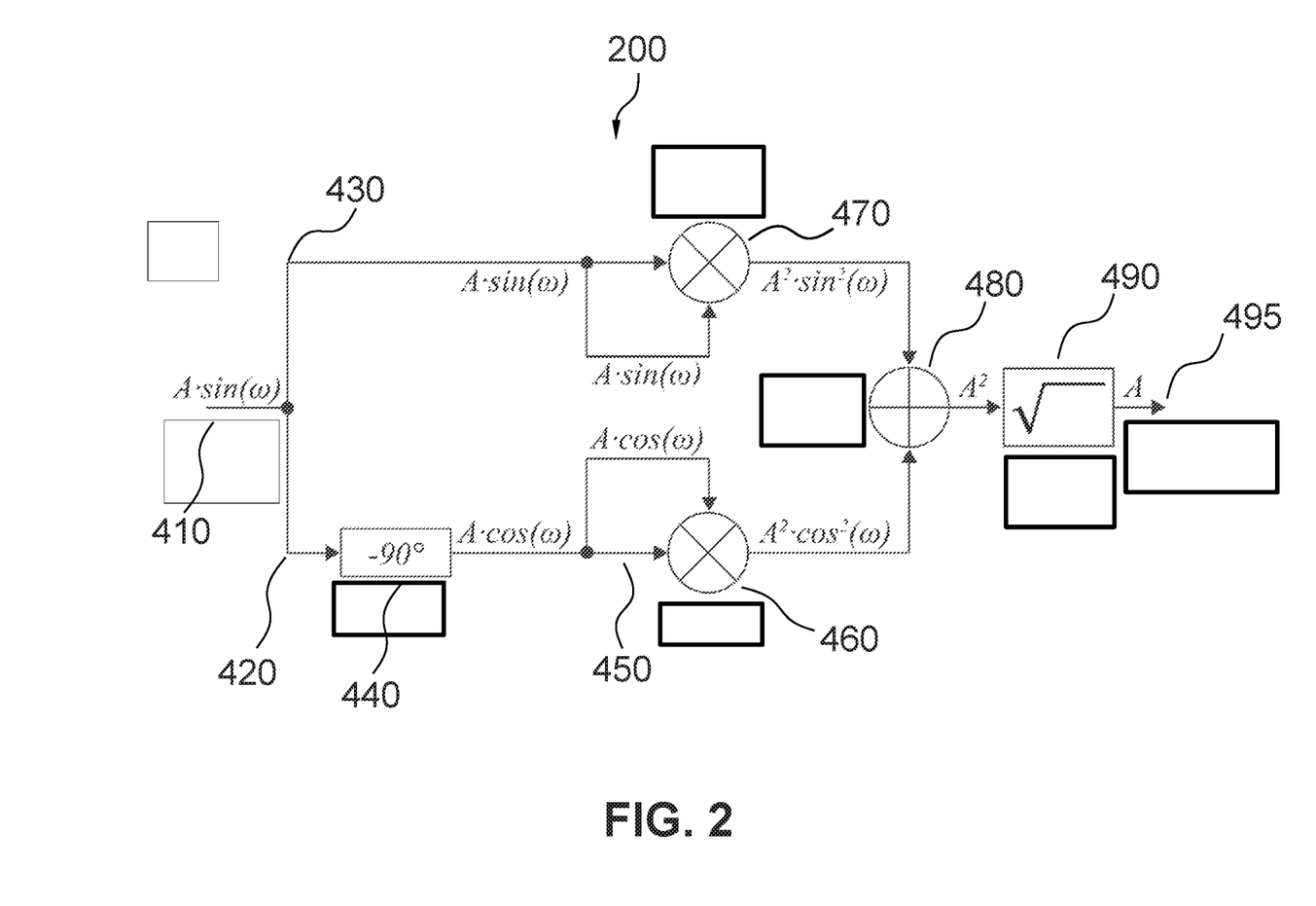
FIG. 2 illustrates a symbolic circuit diagram of a circuit of an amplitude detector suitable for use in the atomic force microscope of FIG. 1, according to a first implementation of the present disclosure.

FIG. 2 illustrates a symbolic circuit diagram of a circuit 200 of an amplitude detector suitable for use in the atomic force microscope of FIG. 1, according to some implementations of the present disclosure. In FIG. 2, an input branch 410 is configured to receive, for example, a sinusoidal wave signal obtained from the cantilever vibration during AFM scanning (e.g., from the optical sensor 180) of a sample 120. The amplitude of the cantilever vibration is represented in the Figure by "A" and the vibration frequency (or resonant frequency) is represented in the Figure by "ω". Thus, the input signal can be expressed as $A \cdot \sin(\omega)$. The input branch 410 splits into a first branch 420 and a second branch 430. The first branch 420 feeds the input signal $A \cdot \sin(\omega)$ to a phase shifter 440 which is a $-90$ degree phase shifter. The phase shifter 440 outputs a signal with a $-90$ degree phase shift relative to the input signal, which is the equivalent of $A \cdot \cos(\omega)$, to a multiplier 460 which squares the signal output from the phase shifter 440. The multiplier 460, can be, for example, a four quadrant multiplier. The squared signal is equal to $A^2 \cdot \cos^2(\omega)$. On the second branch 430, the original input signal $A \cdot \sin(\omega)$ is fed to a multiplier 470 which squares the input signal $A \cdot \sin(\omega)$. The multiplier 470 can also be a four quadrant multiplier. The squared signal is $A^2 \cdot \sin^2(\omega)$. Then, the outputs of both multipliers 460 and 470, i.e., $A^2 \cdot \sin^2(\omega)$ and $A^2 \cdot \cos^2(\omega)$, are summed together by an adder or summing component 480 at a node merging the first and second branches 420 and 430. As $\sin^2(\omega)+\cos^2(\omega)=1$, this sum reduces to $A^2$. The adder 480 then outputs the result, $A^2$, toward a square-rooting component 490, which outputs the amplitude A.

In some implementations, each of the logic components shown in FIG. 2, i.e., the phase shifter 440, the multipliers 460 and 470, and the adder 480, and the square rooting component 490, can be implemented using analog electronic components. The logic components can be implemented using circuits combining standalone analog components, such as op-amps, capacitors, and resistors, or using more complex analog integrated circuits known to persons of ordinary skill in the art, and which are commercially available, for example, from Analog Devices of Norwood, Mass. In some implementations, some or all of the logic components can be implemented using digital processors, such as digital signal processors, application specific integrated circuits, field programmable gate arrays, or a microprocessor having the appropriate programming stored in memory.

Figure 3:
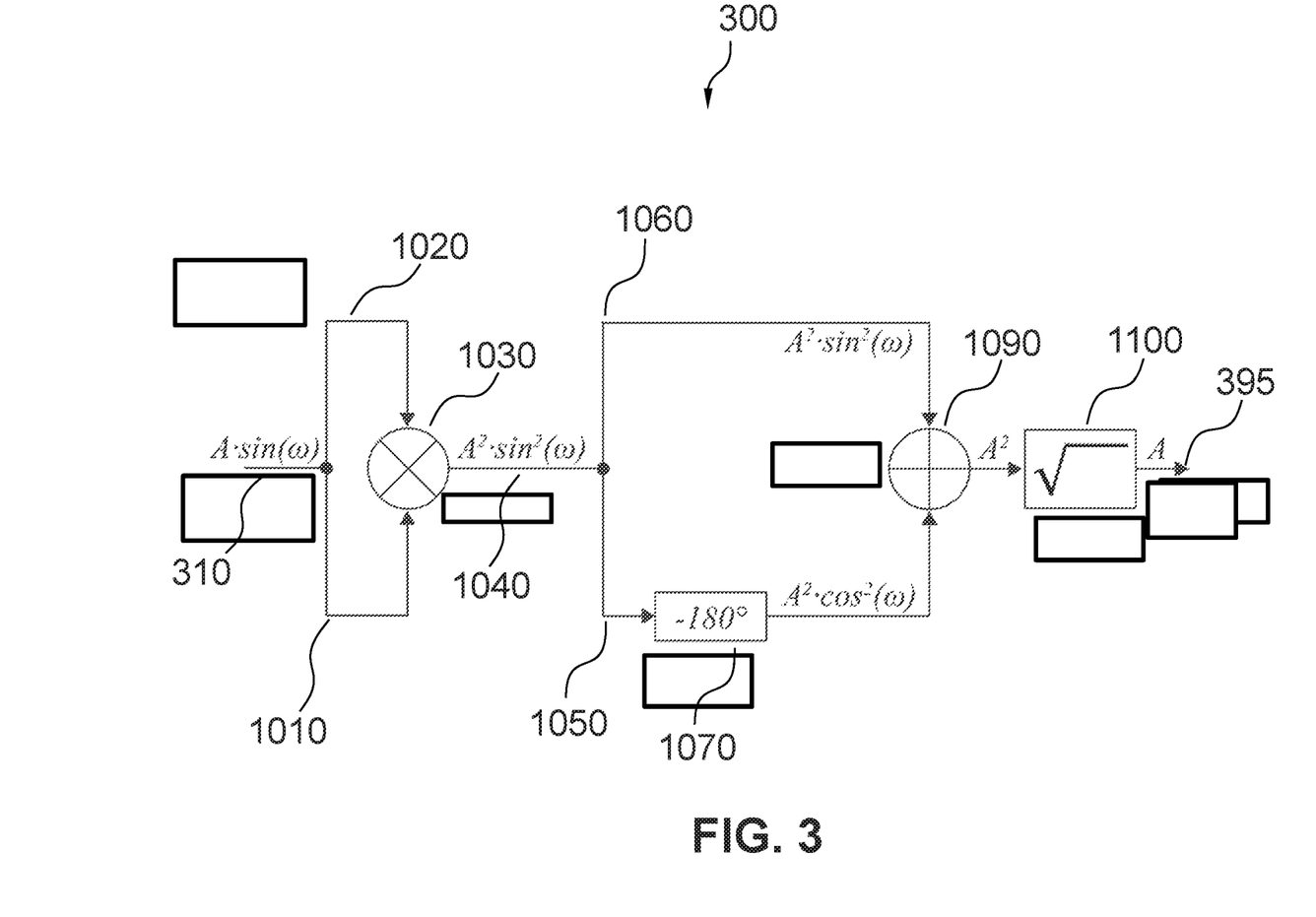
FIG. 3 illustrates a symbolic circuit diagram of an alternative circuit 300 suitable for use in the amplitude detector of the atomic force microscope of FIG. 1, according to a second implementation of the present disclosure.

FIG. 3 illustrates a symbolic circuit diagram of an alternative circuit 300 suitable for use in the amplitude detector of the atomic force microscope of FIG. 1. In FIG. 3, an input branch 310 is configured to receive, for example, a sinusoidal wave signal detected from monitoring the cantilever vibration during AFM scanning of a sample 120. The signal can be output, e.g., by the optical sensor 180 shown in FIG. 1. The amplitude of the cantilever vibration signal is represented in FIG. 3 by "A" and the vibration frequency (or resonant frequency) is represented by "ω." Thus, the input signal can be expressed as $A \cdot \sin(\omega)$. The input branch 310 splits into a first branch 1010 and a second branch 1020. The first and second branches 1010 and 1020 merge at a multiplier 1030 which outputs a signal equal to $A^2 \cdot \sin^2(\omega)$. This output branch 1040 from the multiplier 1030 splits into a third branch 1050 and a fourth branch 1060. The third branch 1050 feeds the signal of $A^2 \cdot \sin^2(\omega)$ to a phase shifter 1070, such as a $-180$ degree phase shifter, which outputs a signal equal to $A^2 \cdot \cos^2(\omega)$, which is then fed to a summing component 1090. The fourth branch 1060 feeds the $A^2 \cdot \sin^2(\omega)$ signal output by the multiplier 1030 to the summing component 1090. The summing component 1090 sums the signals $A^2 \cdot \sin^2(\omega)$ and $A^2 \cdot \cos^2(\omega)$, which equals $A^2$. The $A^2$ signal is output to a square-rooting component 1100, which then outputs a signal of amplitude A to an output branch 395. As with the circuit shown in FIG. 2, the logic components depicted in the circuit shown in FIG. 3 can be implemented using standard analog circuit components, analog integrated circuits, and/or digital processors.

Figure 4:
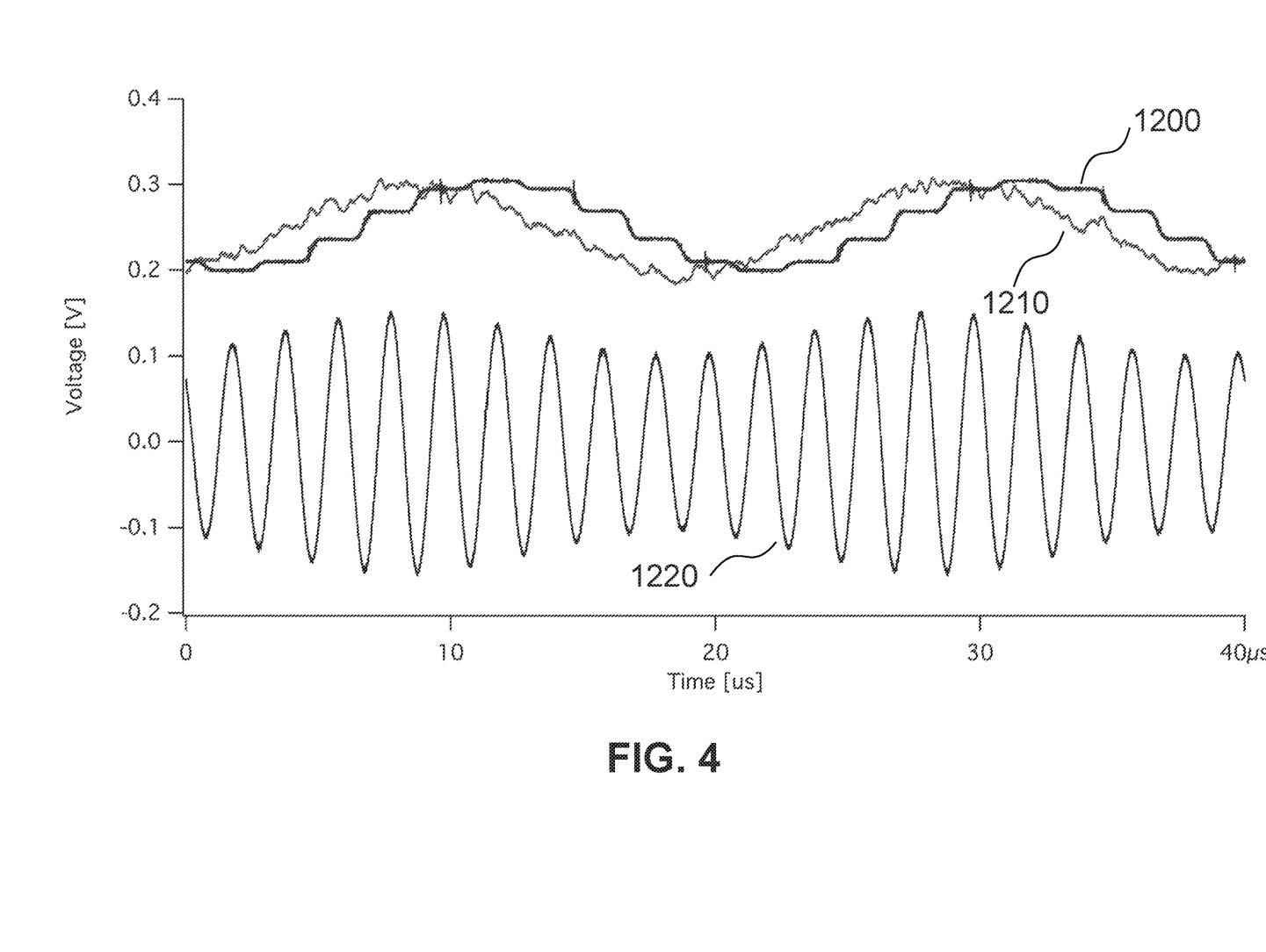
FIG. 4 illustrates a signal obtained by a conventional amplitude detector and a signal obtained by an amplitude detector designed in accordance with the present disclosure; for example, using a circuit similar to that shown in FIGS. 2 and 3.

FIG. 4 illustrates a signal obtained by a conventional amplitude detector and a signal obtained by an amplitude detector designed in accordance with the present disclosure e.g., using a circuit similar to that shown in FIGS. 2 and 3. In FIG. 4, the amplitude wave of the input signal 1220 was a modulated low frequency wave. The amplitude of this signal 1220, derived using the conventional Fourier transform method, is shown as curve 1200. Because the Fourier transform methodology processes data once per cycle, spaced apart by one wavelength of the sinusoidal wave (i.e., spaced apart by 360 degrees in phase), the curve 1200 includes significant step features. It also updates in a discrete fashion at each cycle of the input signal. Curve 1210 shows an amplitude signal calculated using circuits similar to those shown in FIGS. 2 and 3, in which both an original input signal and a phase shifted version of that signal are squared, summed together, and then square-rooted to obtain an amplitude value. Processed in such a manner, the amplitude curve 1210 shows a curve with reduced step features and a faster response time, responding more rapidly to modulations of the input wave amplitude, which correspond to changes in the sample characteristics. Instead of only changing values once per cycle, the continuous nature of this amplitude detection methodology allows output values to be changed continuously, and with a delay as little as a quarter of a signal cycle. As a result, this processing yields improved efficiency and precision when using high-speed AFM with high frequency cantilevers, for example, at frequencies that greater than or equal to about 500 kHz.

Figure 5:
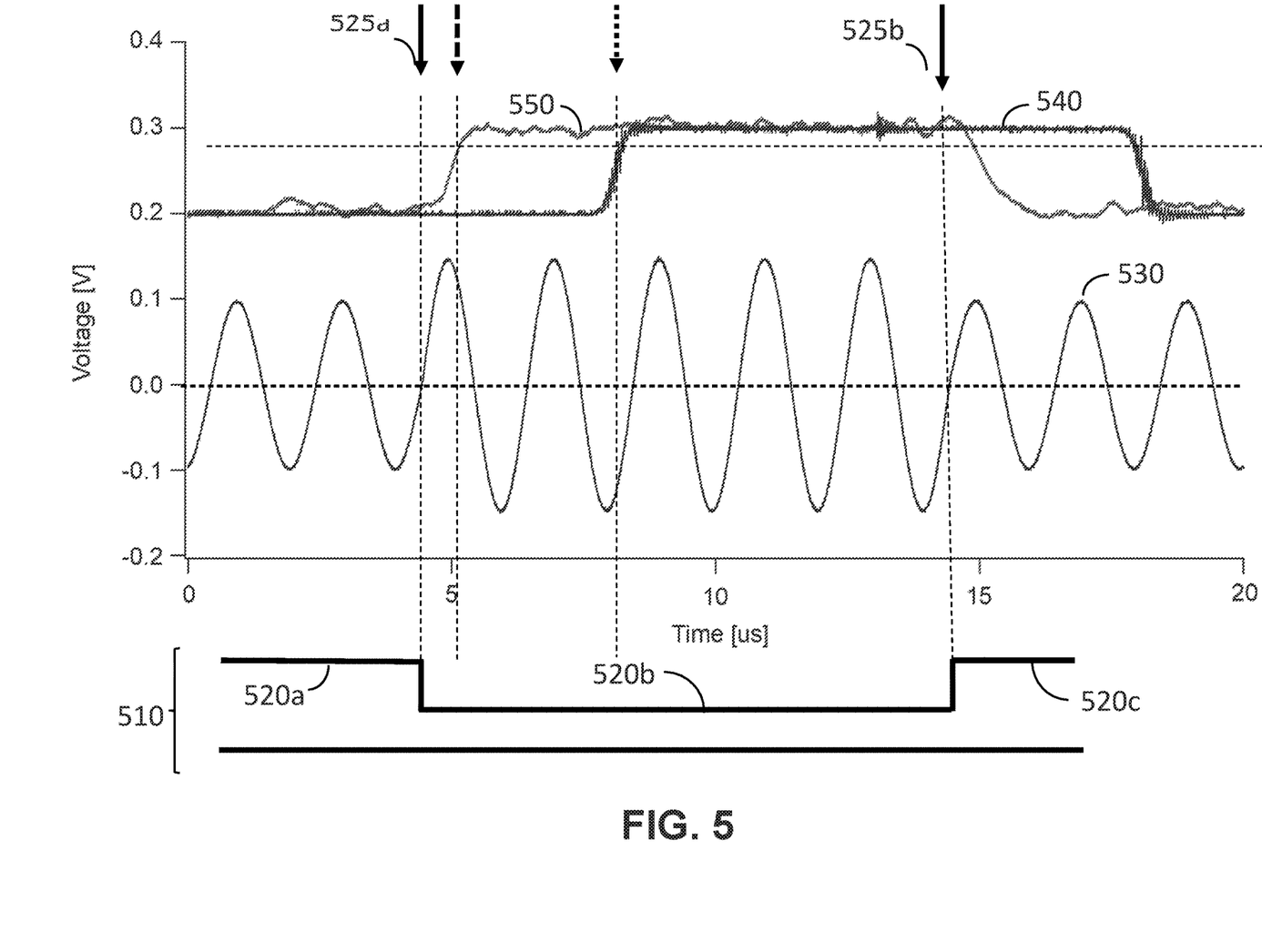
FIG. 5 shows an example of the improvements yielded by amplitude detection circuits similar to those shown in FIGS. 2 and 3.

FIG. 5 shows an example of the improvements yielded by amplitude detection circuits similar to those shown in FIGS. 2 and 3. FIG. 5 shows a comparison of output signals from both a traditional Fourier transform analysis and using circuitry and methodology similar to that shown in FIGS. 2 and 3 in relation to the scan of a schematic representative sample 510. The sample 510 shown in FIG. 5 has three regions 520a, 520b, and 520c. Region 520b lies between regions 520a and 520c and has a greater less than regions 520a and 520b.

Above the sample 510 are three plot lines. The generally sinusoidal plot line 530 is the simulated result (generated by a function generator) of scanning the sample 510. Due to the step function cross-sectional geometry of the schematic sample 510, the function generator introduces a sudden change of amplitude at time instants 525a and 525b, corresponding to times at which the tip of an AFM would transition from scanning region 520a to scanning region 520b and transitioning from scanning region 520b to region 520c (indicated by the dashed lines below the solid arrows in FIG. 5). This signal 530 serves as the input to the amplitude detection circuitry of the AFM controller. Ideally, an amplitude detection circuit of an AFM would detect these amplitude changes substantially upon the occurrence of the change.

The plot line 540 represents the output of a standard Fourier transform based amplitude detector processing the signal 530 as an input. As can be seen in FIG. 5, the standard Fourier transform based amplitude detector does not detect the change in actual amplitude until more than 1.89 cycles of the input signal after the amplitude change occurred (at the dotted arrow). This is due to the Fourier transform based amplitude detection methodology generating an output value only once per cycle.

The plot line 550 represents the output of the amplitude methodology disclosed herein processing the signal 530 as an input, in which the amplitude is determined continuously using circuitry similar to that shown in FIGS. 2 and 3. Given the continuous nature of this signal processing, the change in input signal amplitude is detected in less than half a cycle (at the dashed arrow) of the input signal 530, representing a 4.9 times improvement (shortening) in response time.

In an experiment conducted to verify these results, a sinusoidal signal having a typical AFM frequency of 500 kHz convolved with a step function was analyzed by both a standard Fourier transform method amplitude detection methodology and the processing described herein. The step function included a peak-to-peak voltage change of 200 mV to 300 mV. The Fourier transform methodology detected a change equal to 90% of this amplitude change with a phase delay of 682 degrees. The output of the analog, phase-shift based analysis reached the 90% amplitude change with only a 138 degree phase delay, a greater than 4.9× improvement.

Figure 6:
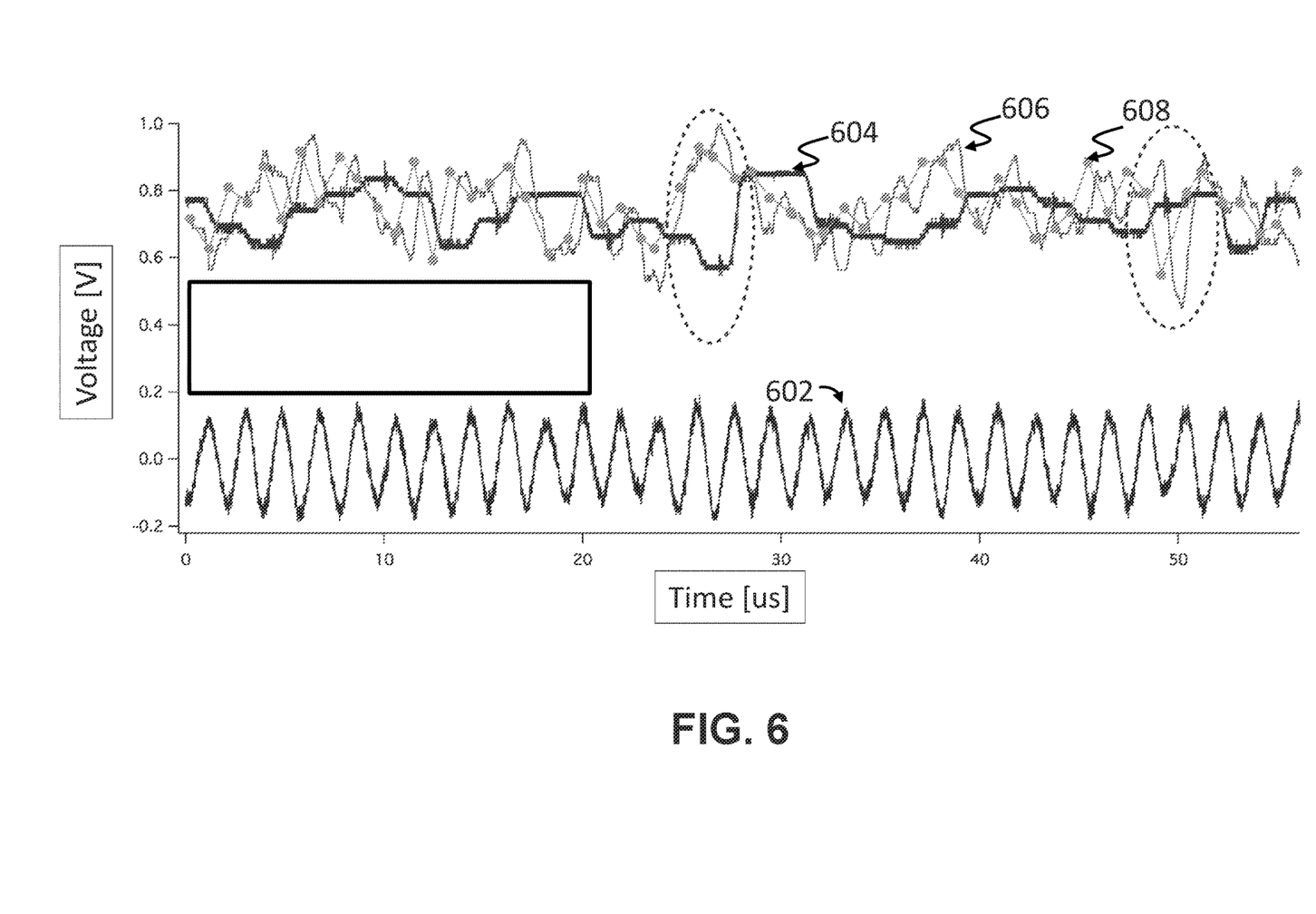
FIG. 6 illustrate additional experimental data demonstrating the improved performance of the amplitude detection techniques disclosed herein relative to the traditional Fourier-transform-based techniques.

FIG. 6 illustrates additional experimental data demonstrating the improved performance of the amplitude detection techniques disclosed herein relative to the traditional Fourier transform based techniques. The plots in FIG. 6 were generated using the actual cantilever oscillation signal 602 when oscillating in liquid. The plot then displays three amplitude signals generated based on the cantilever oscillation signal. The first output line 604 represents the output of a Fourier-transform based analysis of the oscillation signal. The second output line 606 represents the output of an example circuit implementing the analog logic disclosed herein, and the third output line 608 represents a series of discrete values representing the square root of the squares of the signal peaks. Thus, the third output line 608 is considered to represent the real amplitude values of each negative and positive peak of the cantilever oscillation motion. As seen in FIG. 6, the second output line 606 closely tracks the third output line 608, but the first output line 604 lags substantially behind. Given the amplitude values are used in part for driving the feedback to mediate the z-piezo movements either underneath the sample stage or the cantilever (depending on whether a sample scanning or a tip scanning AFM is operated), this delay can lead to decreased performance (e.g., speed) and decreased accuracy of an AFM.

The foregoing outlines features of several implementations or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the implementations or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of amplitude detection of an atomic force microscope, comprising:
    receiving a first signal indicative of motion of a tip of a cantilever in response to scanning of the tip over the surface of a sample while the cantilever is being driven at a resonant frequency of the cantilever in amplitude modulation mode,
    calculate a resultant amplitude signal by square-rooting a signal having a value equal to a sum of a square of the first signal and a squared and phase-shifted version of the first signal, and
    outputting the resultant amplitude signal.

2. The method of claim 1, wherein the first signal is a sinusoidal signal.

3. The method of claim 1, wherein the phase-shifted version of the first signal is phase shifted by −90 degrees.

4. The method of claim 1, wherein the phase-shifted version of the first signal is phase shifted by −180 degrees.

5. The method of claim 1, wherein the calculation of the resultant amplitude signal is carried out by analog circuitry.

6. The method of claim 5, wherein the analog circuitry comprises at least one analog integrated circuit.

7. The method of claim 1, wherein the calculation of the resultant amplitude signal is carried out by digital logic, comprising at least one of a DSP, an ASIC, and FPGA, and a programmed microprocessor.

* * * * *